United States Patent
Tsuneyoshi et al.

(10) Patent No.: US 7,273,119 B2
(45) Date of Patent: Sep. 25, 2007

(54) METHOD FOR STARTING ENGINE OF VEHICLE WITH HYBRID TRANSMISSION AND APPARATUS FOR CARRYING OUT THE METHOD

(75) Inventors: Takashi Tsuneyoshi, Kanagawa (JP); Toshikazu Oshidari, Kanagawa (JP); Tomoya Imazu, Yokohama (JP); Shinichiro Joe, Yokohama (JP); Yuki Nakajima, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 244 days.

(21) Appl. No.: 11/002,262

(22) Filed: Dec. 3, 2004

(65) Prior Publication Data

US 2005/0121239 A1    Jun. 9, 2005

(30) Foreign Application Priority Data

Dec. 5, 2003    (JP) .............................. 2003-406928

(51) Int. Cl.
*B60K 1/00*    (2006.01)

(52) U.S. Cl. ........................ 180/65.2; 701/22; 903/941; 903/946

(58) Field of Classification Search ............... 180/65.2, 180/65.3; 701/22; 903/946, 941
See application file for complete search history.

(56) References Cited

U.S. PATENT DOCUMENTS 6,018,198 A    1/2000    Tsuzuki et al.
6,244,368 B1 *    6/2001    Ando et al. ................ 180/65.2
6,655,485 B1 *    12/2003   Ito et al. .................... 180/65.6
6,722,332 B2 *    4/2004    Kojima ..................... 123/179.3

FOREIGN PATENT DOCUMENTS

| EP | 1 090 792 A2 | 4/2001 |
|---|---|---|
| EP | 1 193 101 A1 | 4/2002 |
| JP | 11-082260 A | 3/1999 |
| JP | 11-082261 A | 3/1999 |
| JP | 11-205907 A | 7/1999 |
| JP | 2001-112118 A | 4/2001 |
| JP | 2001-113971 A | 4/2001 |
| JP | 2003-034153 A | 2/2003 |
| JP | 2003-278855 A | 10/2003 |

OTHER PUBLICATIONS

U.S. Appl. No. 10/982,882, filed Nov. 8, 2004, Joe.

* cited by examiner

*Primary Examiner*—Christopher Bottorff
(74) *Attorney, Agent, or Firm*—Foley & Lardner LLP

(57) ABSTRACT

A method for starting an engine of a vehicle having a hybrid transmission is provided. The hybrid transmission is capable of providing motor running under a power of an electric motor only and hybrid running under a power of both of the engine and the electric motor. The power of an engine is supplied to the hybrid transmission by way of a clutch. The method includes, when the clutch is engaged for starting the engine during the motor running, issuing an engine start instruction when an engine speed increases to a startable speed with the progress of engagement of the clutch, and after the moment of issue of the engine start instruction, restricting increase of an engagement force of the clutch and thereby suppressing the progress of engagement of the clutch. An apparatus for carrying out the method is also provided.

7 Claims, 4 Drawing Sheets

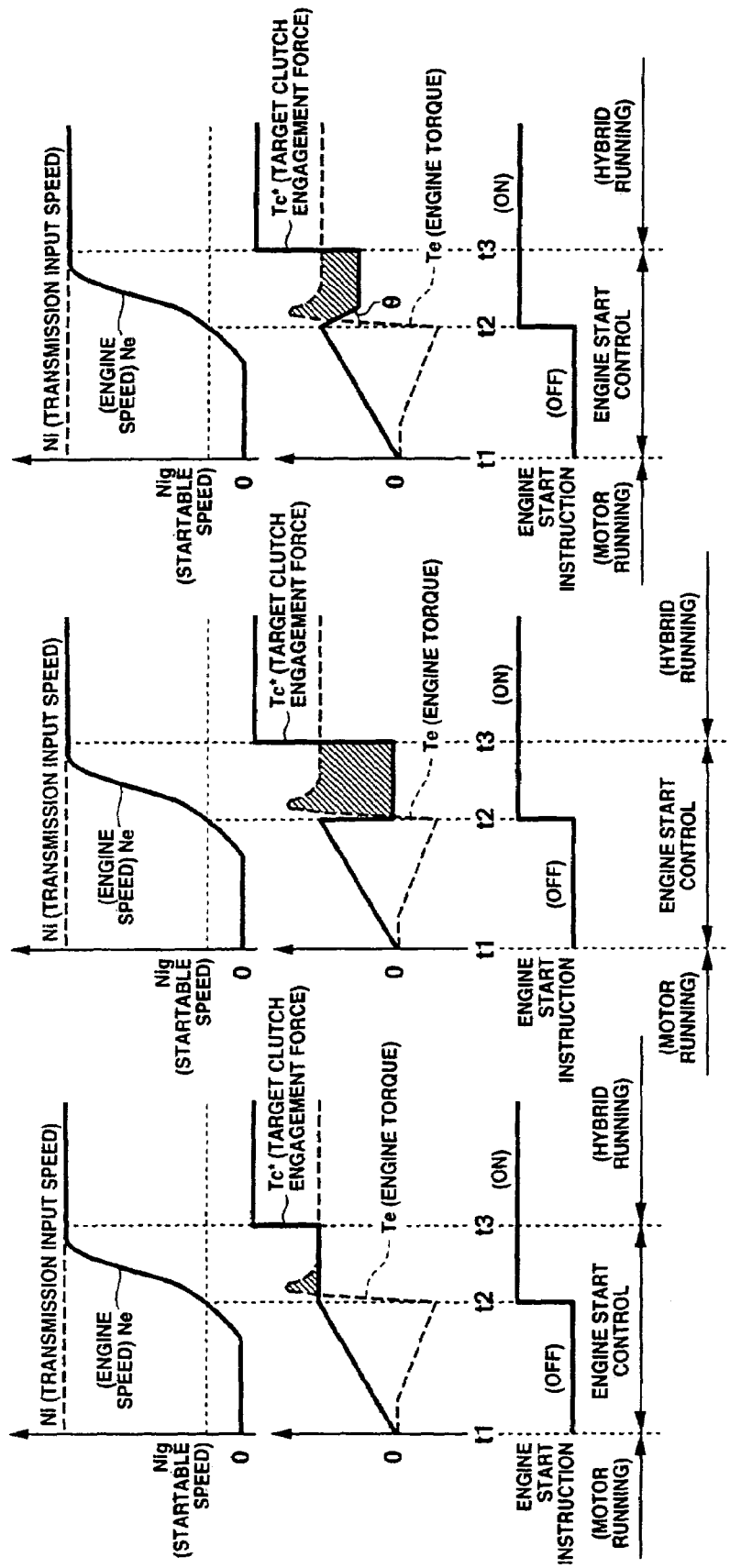

METHOD FOR STARTING ENGINE OF VEHICLE WITH HYBRID TRANSMISSION AND APPARATUS FOR CARRYING OUT THE METHOD

BACKGROUND OF THE INVENTION

The present invention relates to a method for starting an engine of a vehicle having a hybrid transmission and particularly to a technique for suppressing vibrations caused by torque variations at start of an engine. The present invention further relates to an apparatus for carrying out the method.

A hybrid transmission is capable of providing motor running in which a vehicle is driven by the power of an electric motor only and hybrid running in which the vehicle is driven by the power of both of an engine and the electric motor. The power of the engine is supplied to the hybrid transmission by way of a clutch.

In the vehicle with the hybrid transmission, motor running is used at start of the vehicle for the reason of smooth start and easy control.

In the meantime, when the vehicle speed exceeds beyond a certain value after start of the vehicle, it is usual practice to drive the vehicle by the power of the engine in place of or in combination with the power of the motor.

Accordingly, during motor running after start of the vehicle, the clutch between the hybrid transmission and the engine is engaged to crank the engine, and when the engine speed increases to startable speed, the engine is started by fueling and firing.

In the meantime, at start of the engine, the engine is unstable in operation, thus causing torque variations which are delivered to a vehicle wheel driveline to cause vibrations.

As a countermeasure for a shock at the time of changing of a running mode from the motor running to engine running in which the vehicle is driven by the power of the engine only, there is known such one as disclosed in Unexamined Japanese Patent Publication No. 11-082261.

SUMMARY OF THE INVENTION

However, even if an engine is started by both of an electric motor for motor running and a starter for start of the engine in a manner as disclosed in the above-described Japanese Patent Publication, it is impossible to eliminate torque variations caused by an unstable engine operating condition occurring during start of the engine, and further it is impossible to prevent such torque variations from being delivered to a vehicle wheel driveline.

Accordingly, by the technique having been proposed heretofore, it is impossible to suppress the vibrations caused by the torque variations during start of the engine.

It is accordingly an object of the present invention to provide an engine start method for a vehicle having an hybrid transmission, which is free from the above-described problem inherent in the prior art.

It is a further object of the present invention to provide an apparatus for carrying out such an engine start method.

To achieve the above objects, there is provided according to an aspect of the present invention a method for starting an engine of a vehicle having a hybrid transmission capable of providing motor running in which the vehicle is driven under a power of an electric motor only and hybrid running in which the vehicle is driven under a power of both of the engine and the electric motor, the power of the engine being supplied to the hybrid transmission by way of a clutch, the method comprising, when the clutch is engaged for starting the engine during the motor running, issuing an engine start instruction when an engine speed increases to a startable speed with the progress of engagement of the clutch, and after the moment of issue of the engine start instruction, restricting increase of an engagement force of the clutch and thereby suppressing the progress of engagement of the clutch.

According to a further aspect of the present invention, there is provided an apparatus for starting an engine of a vehicle having a hybrid transmission capable of providing motor running in which the vehicle is driven under a power of an electric motor only and hybrid running in which the vehicle is driven under a power of both of the engine and the electric motor, the power of the engine being supplied to the hybrid transmission by way of a clutch, the apparatus comprising a controller that is configured to, when the clutch is engaged for starting the engine during the motor running, issue an engine start instruction when an engine speed increases to a startable speed with the progress of engagement of the clutch, and after the moment of issue of the engine start instruction, restrict increase of an engagement force of the clutch and thereby suppressing the progress of engagement of the clutch.

BRIEF DESCRIPTION OF THE DRAWINGS

FIGS. 4A to 4C are motion time charts when an engine is started by the engine start method of the present invention, wherein FIG. 4A is a motion time chart according to a first embodiment, FIG. 4B is a motion time chart according to a second embodiment, and FIG. 4C is a motion time chart according to a third embodiment.

DESCRIPTION OF THE PREFERRED EMBODIMENTS

Figure 1:
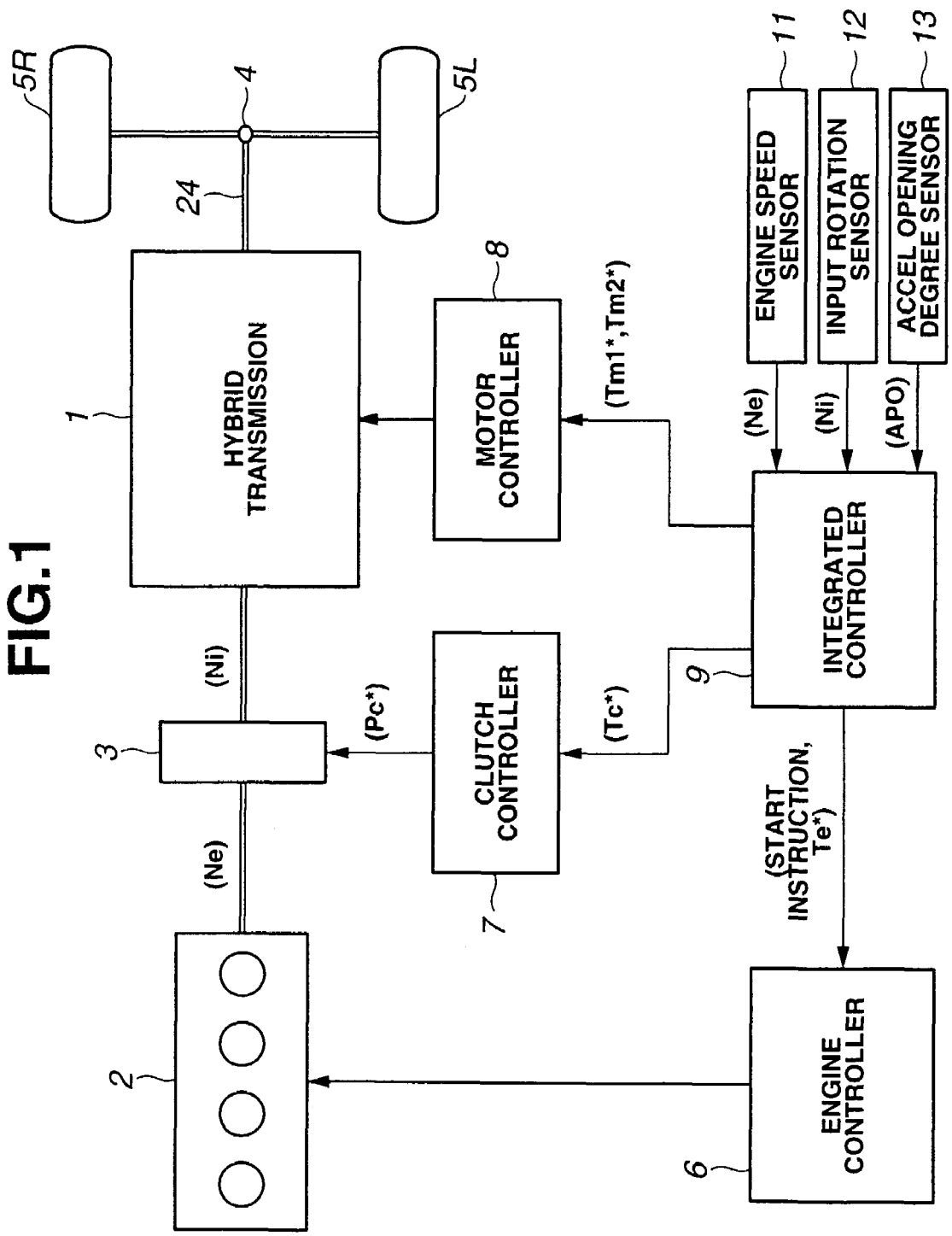
FIG. 1 is a systematic view showing a vehicle drive system of a vehicle with a hybrid transmission, in which an engine start method of the present invention is executed, together with a control system.

Referring to FIG. 1, a vehicle drive system in which an engine start method of this invention is executed includes hybrid transmission 1, engine 2 disposed on the input side of hybrid transmission 1, clutch 3 disposed between hybrid transmission 1 and engine 2, differential gear assembly 4 disposed on the output side of hybrid transmission 1, and left and right drive wheels 5L and 5R to which the output of hybrid transmission is supplied by way of differential gear assembly 4.

Figure 2:
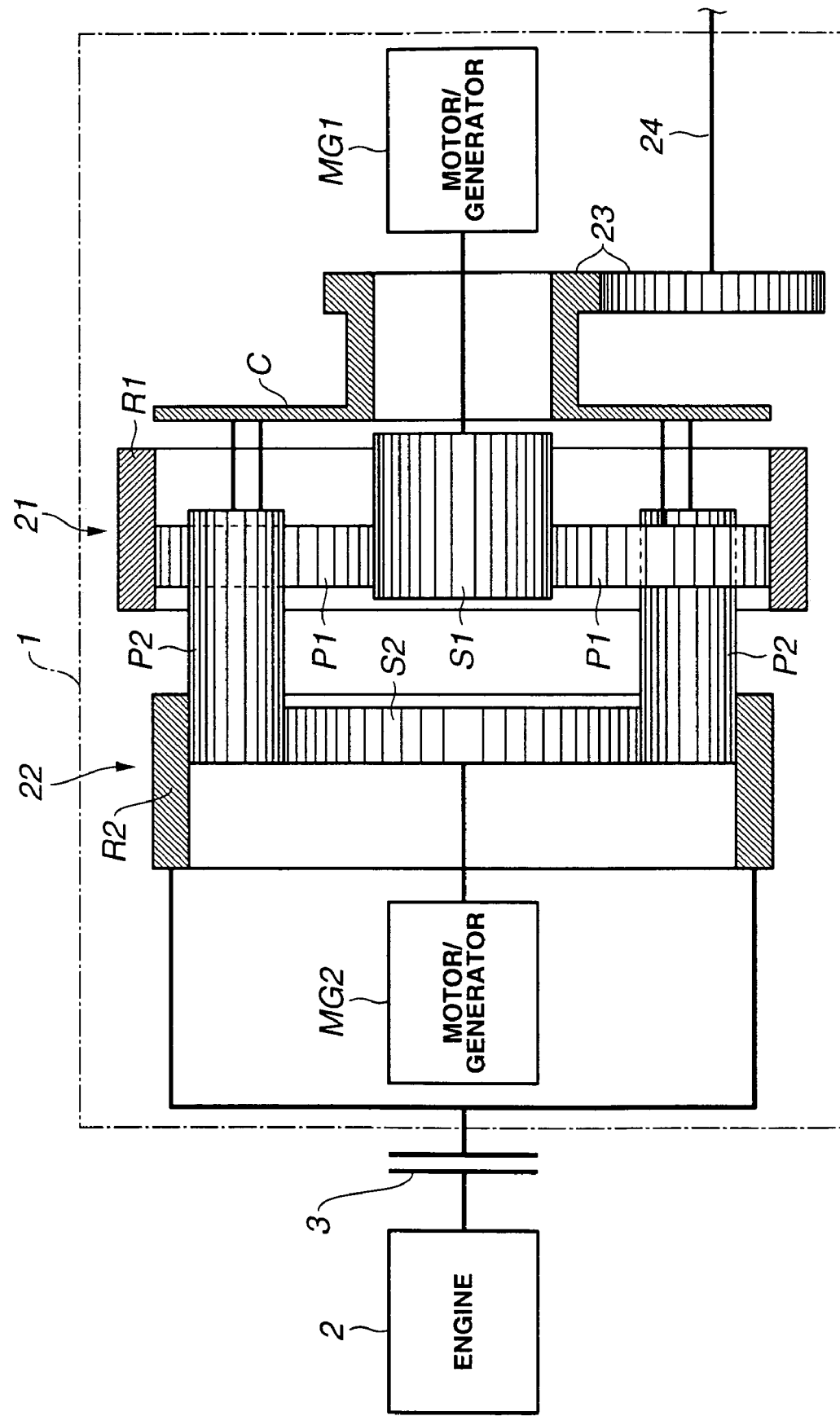
FIG. 2 is a longitudinal sectional view of the hybrid transmission of FIG. 1.

Hybrid transmission 1 has such a structure shown in FIG. 2 and adapted for use in a front engine-rear wheel drive vehicle (FR vehicle).

More specifically, hybrid transmission 1 includes two simple planetary gear sets 21, 22 arranged in an axial direction thereof (in the left-to-right direction in FIG. 2).

Planetary gear set 21 located more remotely from engine 2 includes ring gear R1, sun gear S1 and pinion P1 meshed with those gears.

Planetary gear set 22 located closer to engine 2 includes ring gear R2, sun gear S2 and pinion P2 meshed with those gears.

Pinion P2 of planetary gear set 22 is formed into a long pinion so as to extend to planetary gear set 21 and further meshed with pinion P1 of planetary gear set 21. Pinions P1, P2 are supported by common carrier C so that planetary gear sets 21, 22 constitute a Ravigneaux planetary gear set.

To sun gear S1 of the Ravigneaux planetary gear set is connected first electric motor/generator MG1, and to sun gear S2 is connected second electric motor/generator MG2, thereby constituting hybrid transmission 1.

When such hybrid transmission 1 is disposed in the vehicle drive system, ring gear R2 is connected to an output shaft of engine 2 by way of clutch 3 and carrier C is connected to output shaft 24 by way of output gear set 23, and output shaft 24 is connected to an input of differential gear assembly 4 as shown in FIG. 1.

A control system for the vehicle drive system structured as above includes engine controller 6 for controlling an engine operation including start of engine 2, clutch controller 7 having an oil pressure source for controlling a clutch engagement source of clutch 3, motor controller 8 for controlling motor/generators MG1, MG2 in hybrid transmission 1 and integrated controller 9 for controlling controllers 6 to 8.

Inputted to integrated controller 9 are a signal from engine speed sensor 11 for detecting engine speed (engine side rotation speed of clutch 3) Ne, a signal from input speed sensor 12 for detecting transmission input speed (transmission side speed of clutch 3) Ni, and a signal from accel opening degree sensor 13 for detecting an amount of depression of an accelerator pedal (not shown).

Based on the input information from those sensors, integrated controller 9 performs predetermined calculations and supplies to engine controller 6 an engine start instruction and an instruction concerning target engine torque Te*, to clutch controller 7 an instruction concerning target clutch engagement force Tc*, and to motor controller 8 an instruction concerning target torques Tm1*, Tm2* of motor/generators MG1, MG2.

Engine controller 6, when an engine start instruction and an instruction concerning target engine torque Te* is received from integrated controller 9, starts engine 2 and controls an engine torque so that target engine torque Te* is attained.

Clutch controller 7, when a signal concerning target clutch engagement force Tc* is received from integrated controller 9, supplies clutch 3 such clutch engagement oil pressure Pc that can attain target clutch engagement force Tc*, thereby controlling the clutch engagement force so that the clutch engagement force becomes equal to the target value.

Motor controller 8, when an instruction concerning target motor/generator torques Tm1*, Tm2* is received from integrated controller 9, controls the torques of motor/generators MG1, MG2 so that the target torques are attained.

Figure 3:
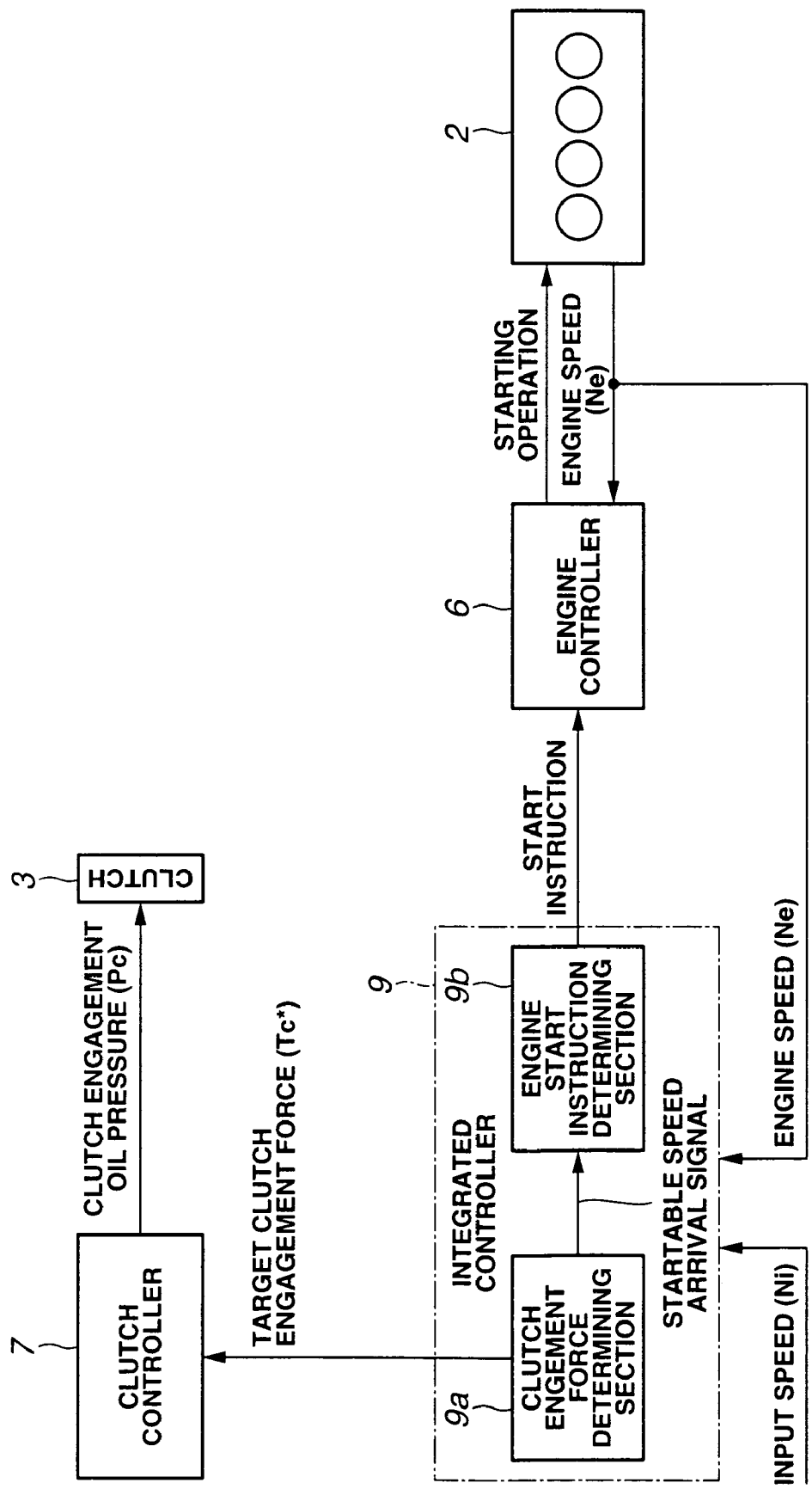
FIG. 3 is a block diagram illustrating a control by an integrated controller when the integrated controller executes an engine start method of this invention.

The control executed by integrated controller 9 at the start of engine 2 during motor running in which the vehicle is driven by the power of motor/generators MG1, MG2 only is classified by functions and shown in the block diagram of FIG. 3. In this instance, integrated controller 9 includes clutch engagement force determining section 9a and engine start instruction determining section 9b.

Clutch engagement force determining section 9a starts motion at the moment t1 of FIG. 4A, i.e., the moment at which a running mode is changed for the necessity of the power of engine 2 during motor running and gradually increases target clutch engagement force Tc* from zero at a predetermined time gradient as shown in FIG. 4A.

Clutch controller 7 supplies clutch engagement oil pressure Pc for realizing target clutch engagement force Tc* to clutch 3 thereby increasing the engagement force of clutch 3 gradually.

Such gradual increase of the clutch engagement force causes engine 2 to be cranked and therefore engine speed Ne to increase as shown in FIG. 4A.

At the moment t2 of FIG. 4A at which engine speed Ne arrives at startable speed Nig, clutch engagement force determining section 9a holds target clutch engagement force Tc* at the value caused at the moment t2 and inhibits the engagement force of clutch 3 from increasing further.

Clutch engagement force determining section 9a simultaneously (at the moment t2) supplies, to engine start instruction determining section 9b, a startable speed arrival signal indicating that engine speed Ne has arrived at startable speed Nig. In response to the signal from clutch engagement section 9a, engine start instruction determining section 9b supplies an engine start instruction to engine controller 6.

In response to the engine start instruction, engine controller 6 executes an engine start control of engine 2 such as an ignition control and a fuel injection control and starts engine 2 as will be apparent from a time-series variation of engine torque Te after the moment t2.

During such engine start, the operation of engine 2 is unstable so that, as will be apparent from engine torque Te after the moment t2, engine 2 causes a torque variation having a peak torque.

In the meantime, according to the engine start method of this embodiment, clutch engagement force determining section 9a holds target clutch engagement force Tc* at a value caused at the startable speed arrival moment (engine start instruction moment) t2 and inhibits the engagement force of clutch 3 from increasing further.

Thus, the engagement force of clutch 3 is held small during engine start, thus allowing clutch 3 to slip upon occurrence of the above-described peak torque during engine start.

Accordingly, the peak portion of engine torque, which exceeds the engagement capacity of clutch 3 and which is indicated by hatching in FIG. 4A, is absorbed by slippage of clutch 3 and is never delivered through hybrid transmission 1 to left and right drive wheels 5L, 5R.

Thus, it becomes possible to eliminate or suppress vibrations otherwise caused due to torque variations during engine start.

At the moment t3 of FIG. 4A engine speed Ne (engine side speed of clutch 3) coincides with transmission input speed (transmission side rotation speed of clutch 3) Ni due to the above-described start of engine 2, i.e., the rotation speeds on both sides of clutch 3 coincide with each other so that the difference in rotation speed between the input side and the output side of clutch 3 becomes zero, clutch engagement force determining section 9a determines to increase target clutch engagement force Tc* having been held constant as described above to a maximum control value and issues an instruction indicative thereof to clutch controller 7.

In response to the instruction from clutch engagement force determining section 9a, clutch controller 7 supplies clutch engagement oil pressure Pc to realize the maximum value of target clutch engagement force Tc*, thereby engaging clutch 3 completely and finishing the engine start control while completing the change of the running mode to hybrid running.

In the meantime, according to the engine start method of this embodiment, after the moment t2 engine speed increases to startable speed Nig and the engine start instruction is issued, the engagement force of clutch 3 is held at the value caused at the engine start instruction moment t2. Thus, as described above, the torque variation during engine start is absorbed by slippage of clutch 3 so that the torque variation during engine start is not delivered to a vehicle wheel driveline by way of clutch 3, thus making it possible to suppress vibrations caused by the torque variation.

Furthermore, since the above-described effect can be attained by a simple control of holding the engagement force of clutch 3 at the value caused at the engine start instruction moment t2, the control is simple and any memory for storing data for use in the control is not necessitated, so that the engine start method of this invention is advantageous from the cost point of view.

Further, since the control is for holding the engagement force of clutch 3 at the value caused at the engine start instruction moment t2, the difference in the clutch engagement force between the moment t2 and the moment t3 at which clutch 3 is completely engaged when the difference in the rotation speed between the input side and the output side of clutch 3 becomes zero, is small, thus making it possible to complete the change of the running mode to the hybrid running rapidly.

In the meantime, in the example of FIG. 4A, after the moment t2 at which engine speed Ne arrives at startable speed Nig, target clutch engagement force Tc* is held at the value caused at the moment t2 and further progress of engagement of clutch 3 is inhibited. In place of this, as shown in FIG. 4B or 4C, target clutch engagement force Tc* may be decreased more than the value caused at the startable speed arrival moment (engine start instruction moment) t2 thereby inhibiting further progress of engagement of clutch 3.

In the embodiment of FIG. 4B, clutch engagement force determining section 9a of FIG. 3 causes target clutch engagement force Tc to become zero at the startable speed arrival moment (engine start instruction moment) t2 thereby disengaging or releasing clutch 3 completely.

By such an engine start method, clutch 3 is in the disengaged or released condition during engine start, thus making it possible to shut off the torque variation during engine start from the vehicle wheel driveline completely such that the largest vibration suppressing effect can be attained.

However, in this instance, the difference in the engagement force between the moment t2 and the moment t3 at which the difference in the rotation speed between the input side and the output side of clutch 3 becomes zero and clutch 3 is engaged completely, is large, thus causing an anxiety as to a delay in movement to the hybrid running and an anxiety as to occurrence of engagement shock of clutch 3.

In the embodiment of FIG. 4C, clutch engagement determining section 9a of FIG. 3 causes, at the startable speed arrival moment (engine start instruction moment) t2, target clutch engagement force Tc* to decrease toward a value intermediate between those of FIGS. 4A and 4B.

By such an engine start method, clutch 3 has an extremely low engagement capacity intermediate between the low engagement capacity described with reference to FIG. 4A and the maximum low (zero) engagement capacity described with reference to FIG. 4B. Thus, the embodiment of FIG. 4C can absorb the torque variation during engine start more assuredly than the embodiment of FIG. 4A while being capable of avoiding an apprehension as to delay in movement to the hybrid running and the engagement shock of clutch 3 as caused in the embodiment of FIG. 4B.

In the meantime, as shown in FIG. 4C, it is preferable, as shown in FIG. 4C, to make the decrease of target clutch engagement force Tc* at the startable speed arrival moment (engine start instruction moment) t2 toward a value intermediate between those of FIGS. 4A and 4B, be done gradually with a predetermined time gradient θ.

In this instance, it becomes possible to suppress the shock caused by stopping the decrease of the engagement force of clutch 3 when target clutch engagement force Tc* that starts decreasing at the startable speed arrival moment (engine start instruction moment) t2 has decreased to the value intermediate between those of FIGS. 4A and 4B.

In either of the embodiments of FIGS. 4A to 4C, there is not caused any shock when clutch 3 is engaged completely since clutch 3 is completely engaged at the moment t3 at which the difference in the rotation speed between the input side and the output side of clutch 3 becomes zero.

The entire contents of Japanese Patent Application P2003-406928 (filed Dec. 5, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An apparatus for starting an engine of a vehicle having a hybrid transmission capable of providing motor running in which the vehicle is driven under a power of an electric motor only and hybrid running in which the vehicle is driven under a power of both the engine and the electric motor, the power of the engine being supplied to the hybrid transmission by way of a clutch, the apparatus comprising a controller that is configured to:
   when the clutch is engaged for starting the engine during the motor running, issue an engine start instruction at a moment when an engine speed increases to a startable speed with progress of engagement of the clutch; and
   after the moment at which the engine start instruction is issued, restrict increase of an engagement force of the clutch and thereby suppressing the progress of engagement of the clutch.

2. An apparatus according to claim 1, wherein the controller is configured to hold an engagement force that is caused by the clutch at the moment at which the engine start instruction is issued.

3. An apparatus according to claim 1, wherein the controller is configured to decrease the engagement force of the clutch more than an engagement force that is caused by the clutch at the moment at which the engine start instruction is issued.

4. An apparatus according to claim 3, wherein the controller is configured to bring the clutch into a disengaged condition.

5. An apparatus according to claim 3, wherein the controller is configured to bring the clutch into a condition where slippage of the clutch occurs.

6. An apparatus according to claim 5, wherein the controller is configured to gradually decrease the engagement force of the clutch from the engagement force that is caused by the clutch at the moment at which the engine start instruction is issued to an engagement force that brings the clutch into a slipping condition.

7. An apparatus according to claim 2, wherein the controller is configured to stop restricting the increase of the engagement force of the clutch when a difference in rotation speed between an input side and an output side of the clutch becomes zero and cause the clutch to be engaged completely.

* * * * *